(12) United States Patent
Hill

(10) Patent No.: US 8,796,878 B1
(45) Date of Patent: Aug. 5, 2014

(54) FRICTIONLESS WIND TURBINE

(71) Applicant: Joseph M. Hill, Hawthorne, CA (US)

(72) Inventor: Joseph M. Hill, Hawthorne, CA (US)

(*) Notice: Subject to any disclaimer, the term of this patent is extended or adjusted under 35 U.S.C. 154(b) by 28 days.

(21) Appl. No.: 13/844,531

(22) Filed: Mar. 15, 2013

(51) Int. Cl.
*F03D 9/00* (2006.01)
*F03D 11/00* (2006.01)

(52) U.S. Cl.
CPC .................... *F03D 11/0008* (2013.01)
USPC .................................................. 290/55

(58) Field of Classification Search
CPC .................................................. Y02E 10/723
USPC .................................................. 290/55
See application file for complete search history.

(56) References Cited

U.S. PATENT DOCUMENTS

| | | | | |
|---|---|---|---|---|
| 3,874,778 A * | 4/1975 | Kato et al. | ............... | 359/200.1 |
| 5,463,257 A * | 10/1995 | Yea | ............... | 290/55 |
| 6,570,286 B1 * | 5/2003 | Gabrys | ............... | 310/90.5 |
| 6,825,588 B2 * | 11/2004 | Gabrys et al. | ............... | 310/90.5 |
| 7,303,369 B2 * | 12/2007 | Rowan et al. | ............... | 415/4.2 |
| 8,487,470 B2 * | 7/2013 | Grassman | ............... | 290/55 |
| 8,497,592 B1 * | 7/2013 | Jones | ............... | 290/44 |
| 8,513,826 B2 * | 8/2013 | Mazur | ............... | 290/44 |
| 2009/0191057 A1 * | 7/2009 | Knutson | ............... | 416/23 |
| 2010/0213723 A1 * | 8/2010 | Kazadi | ............... | 290/55 |
| 2011/0031756 A1 * | 2/2011 | Gabrys | ............... | 290/55 |

FOREIGN PATENT DOCUMENTS

CN 101303046 A * 11/2008

* cited by examiner

*Primary Examiner* — Joseph Waks
(74) *Attorney, Agent, or Firm* — John Alumit

(57) ABSTRACT

A frictionless wind turbine utilizing a plurality of magnetic levitation bearings for magnetic levitation is disclosed. The frictionless wind turbine comprises a housing, a plurality of turbine blades, a rigid shaft, a plurality of magnetic levitation bearings, at least one compression bearing, a plurality of stationary electrical coiled segments and a plurality of magnet segments. The magnetic levitation bearings are arranged in magnetic communication with each other to create a magnetic repulsive force for magnetic levitation. The magnetic levitation bearings and the compression bearing freely rotate around the rigid shaft. The magnetic repulsive force and a twisting motion of the turbine blades cause a rotational motion of the magnet segments, thereby inducing electrical energy in the stationary electrical coiled segments. The electrical energy, induced by means of magnetic induction, is then transferred to wires in the rigid shaft.

18 Claims, 5 Drawing Sheets

FRICTIONLESS WIND TURBINE

CROSS-REFERENCE TO RELATED APPLICATIONS

Not Applicable.

FEDERALLY SPONSORED RESEARCH AND DEVELOPMENT

Not Applicable.

SEQUENCE LISTING OR PROGRAM

Not Applicable.

BACKGROUND

This invention relates to wind turbines, and more particularly to a frictionless wind turbine using turbine blades to rotate at any wind condition and using magnetic levitation bearings to produce a magnetic repulsive force for friction-free rotation of magnet segments to generate electrical energy.

Wind turbines are rotary devices that generate energy from the wind. Coupling a wind turbine to a generator or alternator provides a renewable source of electricity that does not require fossil fuels or excrete carbon byproducts. Most wind turbines are supported by one or more bearing assemblies. These assemblies hold a wind turbine in place and allow its rotation while attempting to minimize operational friction of the wind turbine. Nevertheless, friction in a wind turbine remains a significant problem. Operational friction of a wind turbine can limit the useful force available for power generation and typically leads to reduced reliability and high maintenance costs. This renders the wind turbine at least somewhat ineffective for durable, uninterrupted power generation.

U.S. Pat. Application No. 20100213723 by Kazadi (Aug. 26, 2010) provides a novel wind turbine configuration that utilizes a permanent magnetic male and female levitation support for magnetic levitation. This wind turbine has a female part attached to a payload that is magnetically levitated above a male part of the levitation support. The female part and the payload are further operatively attached to a vertical axle structure that is held stationary by a point of contact. The point of contact and the vertical axle structure provide a stable axis of rotation for the payload and the female part, which can be rotated with near-zero friction. However, the components of the wind turbine contact each other during use, which subjects the above detailed invention to excessive wear and tear.

Moreover, U.S. Pat. Application No. 20090322095 by Mazur (Dec. 31, 2009) discloses a wind turbine having one or more sets of opposing magnets to create an opposing force between a turbine support and a turbine rotor great enough to form a space between the turbine support and turbine rotor, thereby reducing friction between the turbine support and the turbine rotor. The reduction of friction between the turbine rotor and the turbine support allows for an increase in energy production and scale of the wind turbines. However, the wind turbine does not produce energy at lower wind speeds, occupies a lot of space, and requires high maintenance costs.

U.S. Pat. No. 7,303,369 issued to Rowan (Dec. 4, 2007) provides a lift and drag-based vertical axis wind turbine in which the vertical axis and foils mounted thereon are magnetically levitated above the turbine's base, thereby reducing friction within the system. The foils or vanes are three-dimensionally shaped about the vertical axis and capture wind through 360 degrees of rotation under any wind condition. The system has an axial flux alternator using variable resistance coils that can be individually and selectively turned on or off, depending on wind conditions and electrical draw requirements. However, the vertical axis wind turbine is a large-scale installation that cannot be used for commercial purposes when the wind is not blowing. Moreover, the operating cost of the wind turbine is relatively high.

Therefore, there is a need for a frictionless wind turbine utilizing a plurality of turbine blades that can rotate in almost any wind condition. Such a frictionless wind turbine would eliminate contact between components, thereby reducing wear and tear, and the resultant downtime and maintenance costs. Further, this wind turbine would be used as a small-scale device and connect to high-capacity battery storage devices for power on demand. Finally, this wind turbine would operate more efficiently and effectively by producing electrical energy with a minimal amount of wind. The present invention accomplishes all these objectives.

SUMMARY OF THE INVENTION

The present invention is a frictionless wind turbine that uses turbine blades to rotate at any wind condition and magnetic levitation bearings to produce a magnetic repulsive force for friction-free rotation of magnet segments. Said invention comprises a housing, a plurality of turbine blades, a rigid shaft, a plurality of magnetic levitation bearings, at least one compression bearing, a plurality of stationary electrical coiled segments and a plurality of magnet segments. The housing includes a rigid head portion, a rotating shaft portion and a rigid base portion. The turbine blades are attached to the rotating shaft portion. The wind turbine may include a support structure that encloses the housing. The rigid shaft is arranged along a longitudinal axis of the housing. The magnetic levitation bearings are operatively attached to the housing and the magnetic compression bearing is arranged along the longitudinal axis and operatively attached to the rotating shaft portion. The stationary electrical coiled segments are attached to the rigid shaft and the magnet segments are operatively attached to the stationary electrical coiled segments.

Each of the magnetic levitation bearings includes a positive polarity side and a negative polarity side. The magnetic levitation bearings are arranged along the longitudinal axis such that one of the plurality of magnetic levitation bearings is arranged at a bottom portion of the rigid head portion, another of the plurality of magnetic levitation bearings is arranged at a proximal end and/or distal end of the rotating shaft portion, and yet another of the plurality of magnetic levitation bearings is arranged at a top end of the rigid base portion. The compression bearing is arranged at the proximal end and/or the distal end of the rotating shaft portion. The stationary electrical coiled segments are arranged between the magnetic levitation bearings and the compression bearing.

The magnetic levitation bearings and the compression bearing freely rotate around the rigid shaft without touching the rigid shaft. Since the wind turbine does not have parts that interact, none of the internal mechanics are subject to wear and tear. The wind turbine utilizes frictionless mechanics and power can be generated at substantially less wind conditions.

In use, the turbine blades begin to twist upon wind flow. The same magnetic polarity sides of a pair of the plurality of magnetic levitation bearings are arranged in magnetic communication with each other to create a magnetic repulsive force for magnetic levitation. The magnetic repulsive force and the twisting motion of the turbine blades cause a rotational motion of the magnet segments, thereby inducing electrical energy in the stationary electrical coiled segments. The electrical energy induced by means of magnetic induction is then transferred to wires in the rigid shaft. This electrical energy can then be transferred to batteries or coupled to the power grid.

DRAWINGS

Figures 4A, 4B:
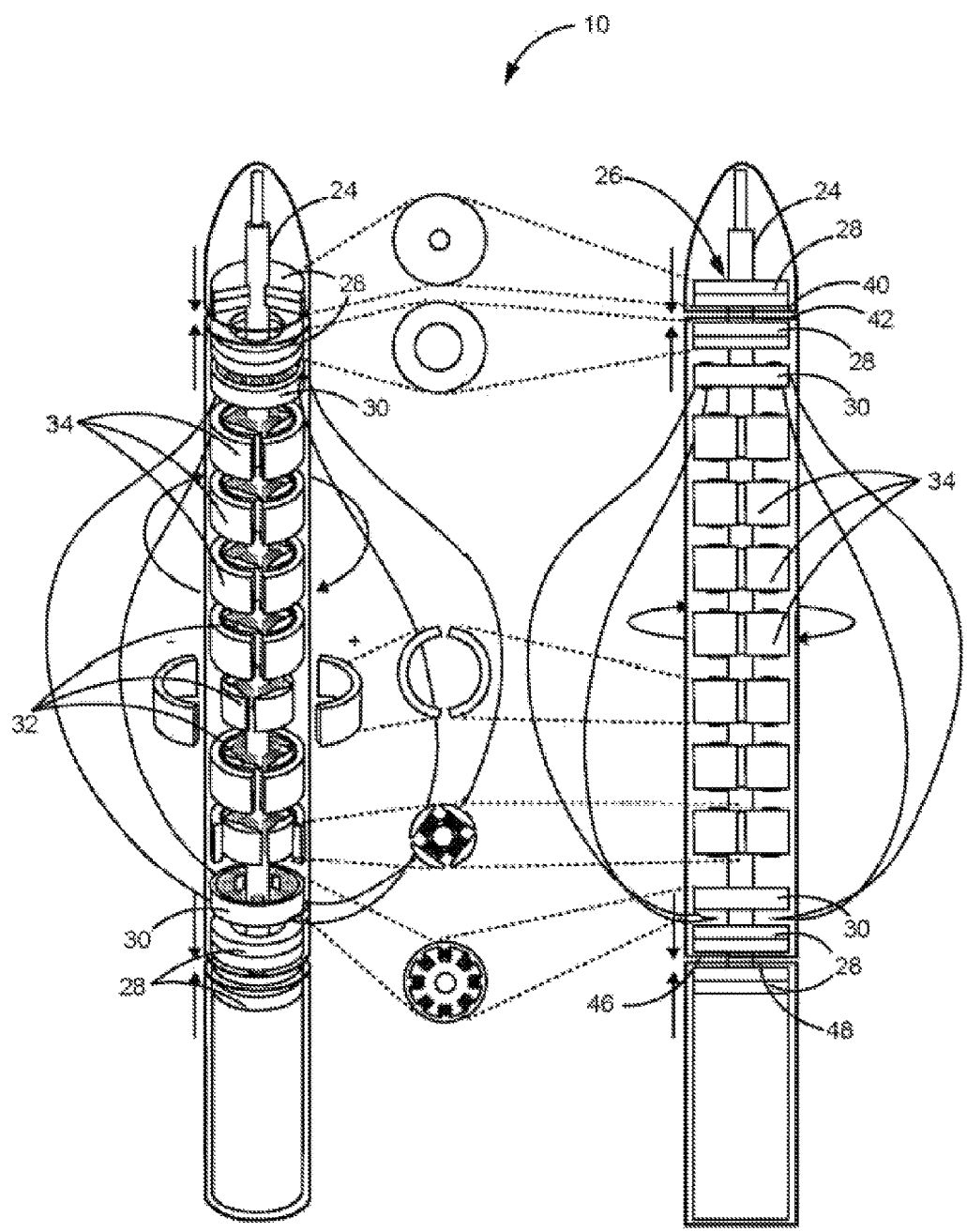
Figure 5:
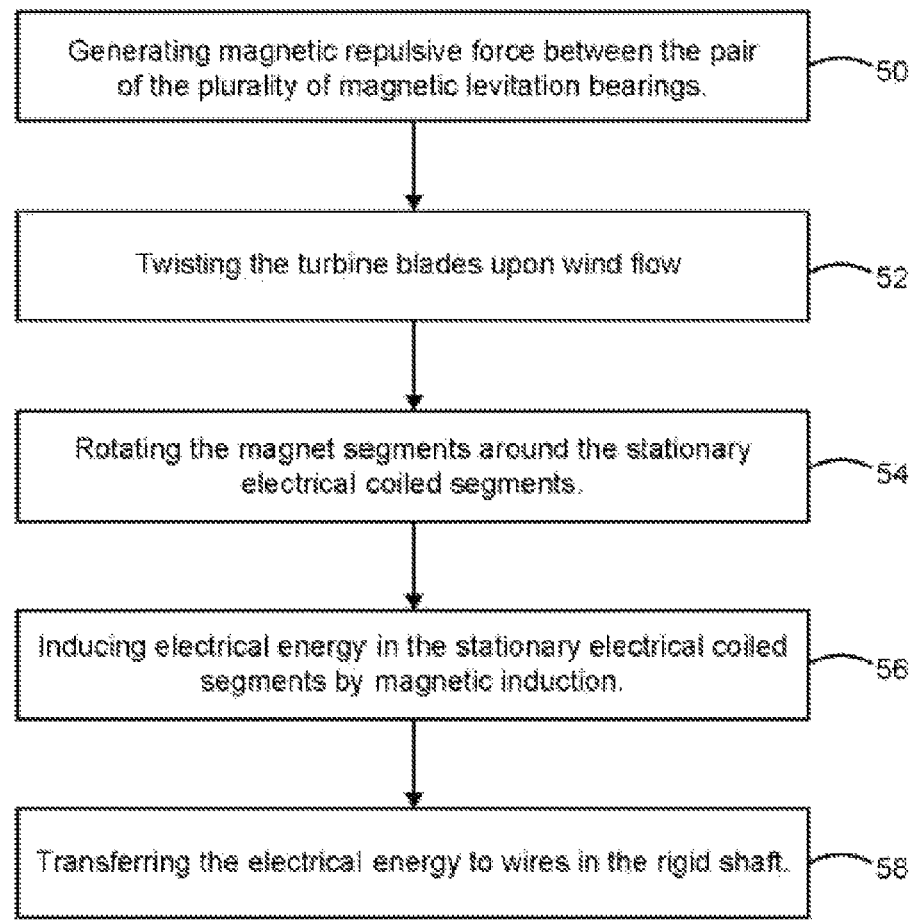

FIGS. 4A and 4B show perspective views of the interior of the present invention, illustrating the plurality of magnetic levitation bearings, the at least one magnetic compression bearing, the plurality of stationary electrical coiled segments and the plurality of magnet segments, each shown in exploded views; and FIG. 5 is a flowchart illustrating a method of generating electricity using the frictionless wind turbine.

DETAILED DESCRIPTION OF THE PREFERRED EMBODIMENT

Figures 1A, 1B:
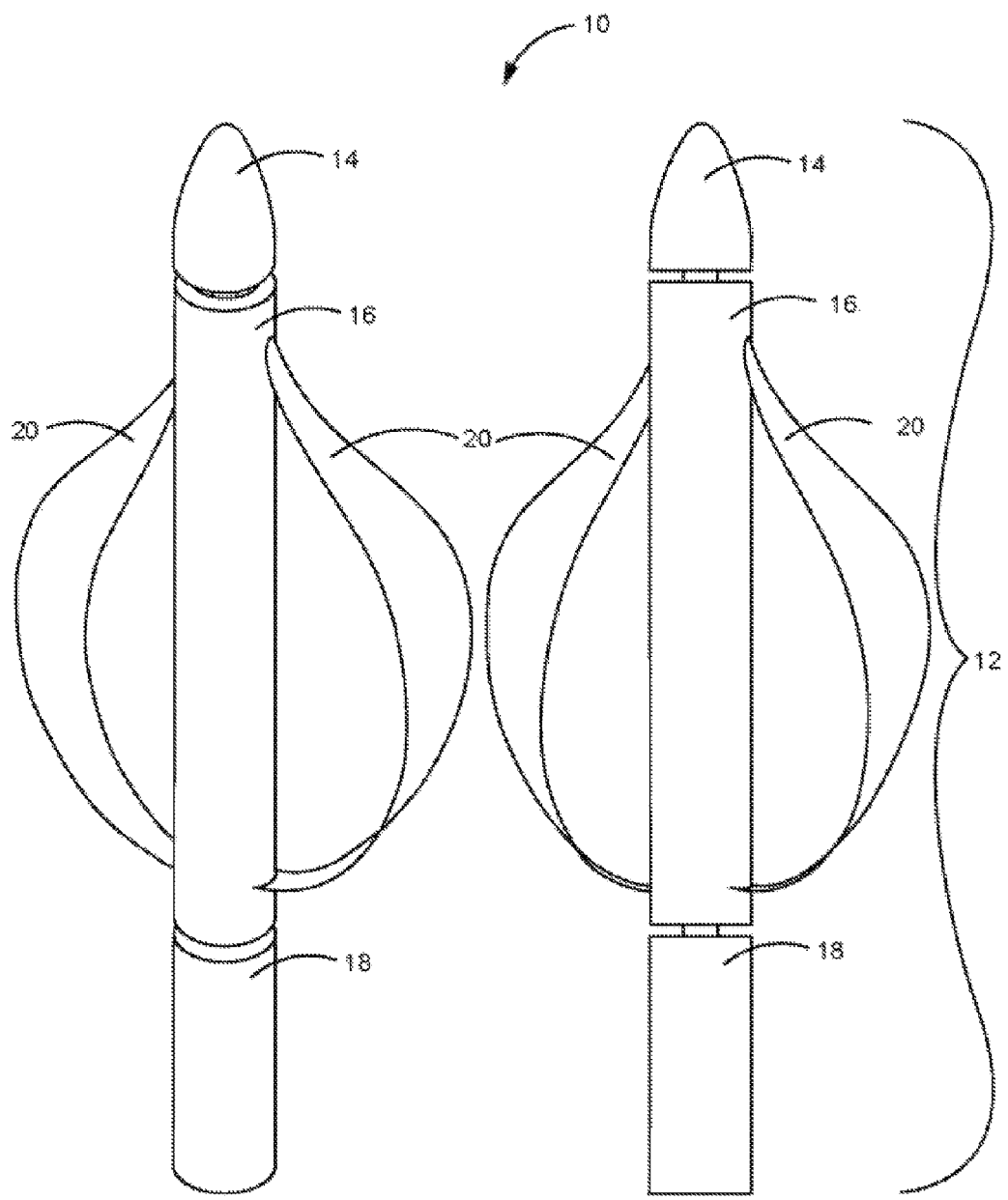
FIGS. 1A and 1B show perspective views of the exterior present invention, illustrating a frictionless wind turbine.
Figure 2:
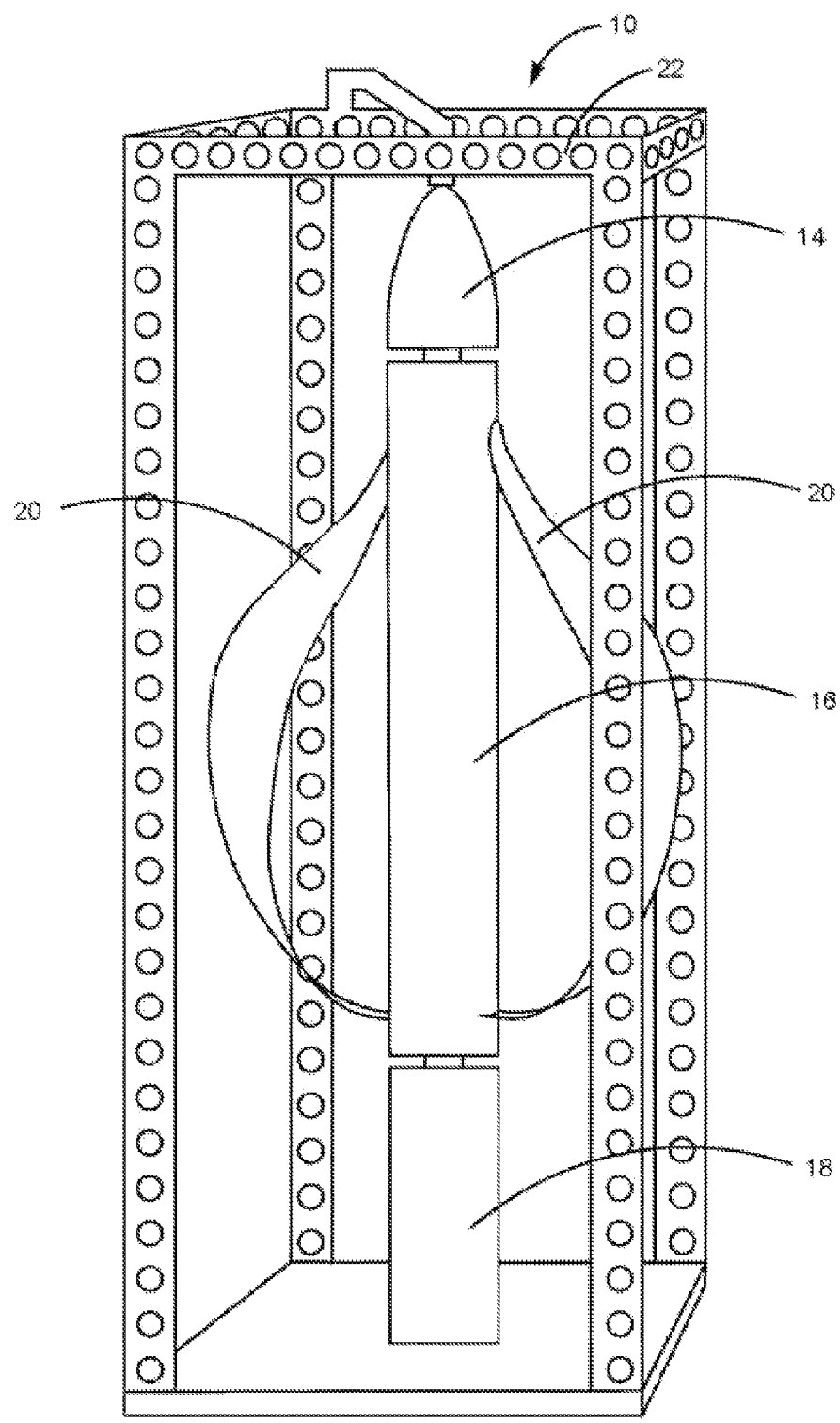
FIG. 2 is a perspective view of the present invention, illustrating a support structure enclosing a housing of the frictionless wind turbine.

FIG. 1 shows perspective views of the exterior of the present invention, illustrating a frictionless wind turbine 10. The wind turbine 10 comprises a housing 12, a plurality of turbine blades 20, a rigid shaft (not shown), a plurality of magnetic levitation bearings (not shown), at least one compression bearing (not shown), a plurality of stationary electrical coiled segments (not shown) and a plurality of magnet segments (not shown). The housing 12 includes a rigid head portion 14, a rotating shaft portion 16 and a rigid base portion 18. The plurality of turbine blades 20 is attached to the rotating shaft portion 16. The wind turbine 10 may include a support structure 22 that encloses the housing 12 as shown in FIG. 2.

Figure 3:
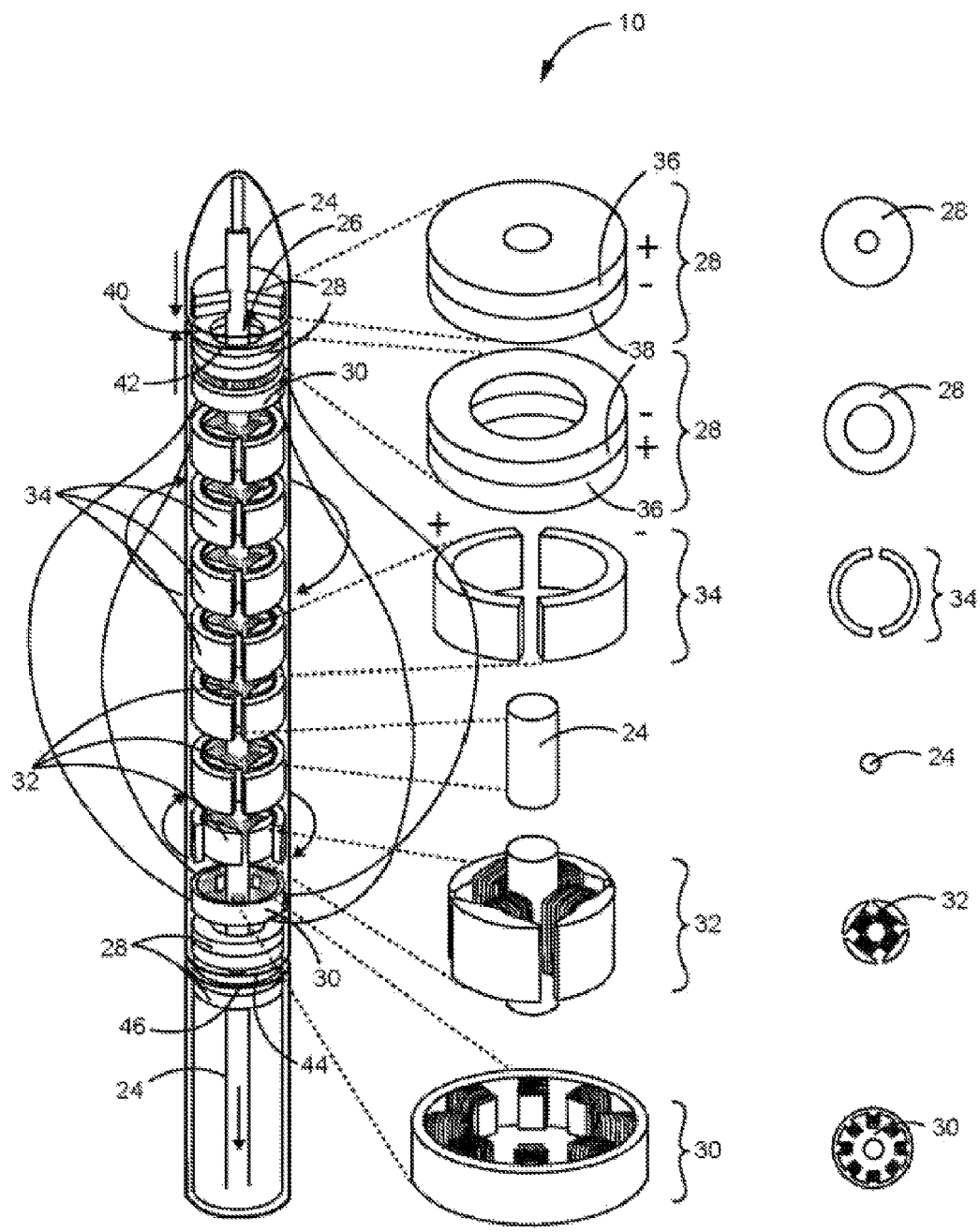
FIG. 3 is a perspective view of the interior of the present invention, illustrating a rigid shaft, a plurality of magnetic levitation bearings, at least one magnetic compression bearing, a plurality of stationary electrical coiled segments and a plurality of magnet segments, each shown in exploded views.

Referring to FIG. 3, the rigid shaft 24 is arranged along a longitudinal axis of the housing 26. The magnetic levitation bearings 28 are operatively attached to the housing 12 and the magnetic compression bearing 30 is arranged along the longitudinal axis 26 and operatively attached to the rotating shaft portion 16. The stationary electrical coiled segments 32 are attached to the rigid shaft 24 and the magnet segments 34 are operatively attached to the stationary electrical coiled segments 32.

Each of the magnetic levitation bearings 28 includes a positive polarity side 36 and a negative polarity side 38. The magnetic levitation bearings 28 are arranged along the longitudinal axis 26 such that one of the plurality of magnetic levitation bearings 28 is arranged at a bottom portion of the rigid head portion 40, another one of the plurality of magnetic levitation bearings 28 is arranged at a proximal end 42 and/or distal end of the rotating shaft portion 44 and another one of the plurality of magnetic levitation bearings 28 is arranged at a top end of the rigid base portion 46.

The same magnetic polarity sides of a pair of the plurality of magnetic levitation bearings 28 are arranged in magnetic communication with each other to create a magnetic repulsive force for magnetic levitation. The compression bearing 30 is arranged at the proximal end 42 and/or the distal end of the rotating shaft portion 44. The stationary electrical coiled segments 32 are arranged between the magnetic levitation bearings 28 and the compression bearing 30. Each of the magnet segments 34 has a magnetic polarity. The magnetic repulsive force generated in the pair of the plurality of magnetic levitation bearings 28 and a twisting motion of the turbine blades 20 causes a rotational motion of the magnet segments 34 thereby inducing electrical energy in the stationary electrical coiled segments 32.

FIGS. 4A and 4B show perspective views of the interior of the present invention. The compression bearing 30 is configured to hold the rigid shaft 24 at a central position within the housing 12 and suspend the housing 12 in a fixed zone. The magnetic levitation bearings 28 and the compression bearing 30 freely rotate around the rigid shaft 24 without touching it. Since the wind turbine 10 does not have parts that interact, none of the internal mechanics are subject to wear and tear. The wind turbine 10 of the present invention utilizes frictionless mechanics and the power can be generated at substantially less wind conditions. The wind turbine 10 requires almost no effort to start twisting the turbine blades 20 because of the use of the magnetic levitation bearings 28.

FIG. 5 is a flowchart illustrating a method of generating electricity using the frictionless wind turbine 10. As shown in block 50, the magnetic repulsive force is generated between the pair of the plurality of magnetic levitation bearings. The turbine blades begin to twist along the longitudinal axis upon wind flow as indicated at block 52. A swivel pin (not shown) may be used to adjust the turbine blades during the twisting motion. The magnetic repulsive force and the twisting motion of the turbine blades causes the plurality of magnet segments to rotate around the stationary electrical coiled segments as indicated at block 54. The rotational motion of the magnet segments induces the electrical energy in the stationary electrical coiled segments by magnetic induction as indicated at block 56. The electrical energy is then transferred to wires in the rigid shaft as shown in block 58. This electrical energy can then be transferred to batteries or coupled to the power grid.

The wind turbine 10 eliminates friction in the area where rotation occurs, eliminates transmission oil required and produces energy with a minimal amount of wind. The frictionless wind turbine 10 further eliminates degradation of internal mechanisms which makes the wind turbine 10 virtually free from maintenance. The wind turbine 10 is scalable from two inches to thousands of feet for mega power plants and can be utilized as a small-scale device for homes, business or commercial properties wherein the wind turbine 10 can be connected to high capacity battery storage devices such as capacitors for power on demand when the wind is not blowing. The wind turbine 10 units can be attached to existing electrical poles and hard wired to the existing power lines feeding energy directly into the grid. Larger mega wind turbines 10 can power municipalities at a far lower cost due to the significant reduction in operating cost and increased efficiency.

While a particular form of the invention has been illustrated and described, it will be apparent that various modifications can be made without departing from the spirit and scope of the invention. Accordingly, it is not intended that the invention be limited, except as by the appended claims.

What is claimed is:

1. A frictionless wind turbine comprising:
   a housing having a rigid head portion, a rotating shaft portion and a rigid base portion;
   a plurality of turbine blades attached to the rotating shaft portion;

a rigid shaft arranged along a longitudinal axis of the housing;

a plurality of magnetic levitation bearings operatively attached to the housing, each of said magnetic levitation bearings having a positive polarity side and a negative polarity side, and each of said magnetic levitation bearings arranged along the longitudinal axis with same magnetic polarity sides of a pair of the plurality of magnetic levitation bearings in magnetic communication with each other to create a magnetic repulsive force for magnetic levitation;

at least one magnetic compression bearing arranged along the longitudinal axis and operatively attached to the rotating shaft portion;

a plurality of stationary electrical coiled segments attached to the rigid shaft along the rotating shaft portion between the plurality of magnetic levitation bearings and the at least one magnetic compression bearing; and a plurality of magnet segments, each having a magnetic polarity, operatively attached to the plurality of stationary electrical coiled segments;

whereby the magnetic repulsive force and a twisting motion of the plurality of turbine blades causes a rotational motion of the plurality of magnet segments thereby inducing electrical energy in the plurality of stationary electrical coiled segments.

2. The frictionless wind turbine of claim 1, wherein the electrical energy is induced in the plurality of stationary electrical coiled segments by means of magnetic induction.

3. The frictionless wind turbine of claim 1, wherein the electrical energy is transferred to wires in the rigid shaft.

4. The frictionless wind turbine of claim 1, wherein the turbine blades are adjustable by means of a swivel pin.

5. The frictionless wind turbine of claim 1, wherein one of the plurality of magnetic levitation bearings is arranged at a bottom portion of the rigid head portion.

6. The frictionless wind turbine of claim 1, wherein one of the plurality of magnetic levitation bearings is arranged at a proximal end and/or a distal end of the rotating shaft portion.

7. The frictionless wind turbine of claim 1, wherein one of the plurality of magnetic levitation bearings is arranged at a top end of the rigid base portion.

8. The frictionless wind turbine of claim 1, wherein the at least one magnetic compression bearing is arranged at a proximal end and/or a distal end of the rotating shaft portion.

9. The frictionless wind turbine of claim 1, wherein the at least one magnetic compression bearing is provided to suspend the housing in a fixed zone.

10. The frictionless wind turbine of claim 1, wherein the at least one magnetic compression bearing is configured to hold the rigid shaft at a central position within the housing.

11. The frictionless wind turbine of claim 1, wherein the magnetic levitation bearings and the at least one magnetic compression bearing freely rotate around the rigid shaft.

12. The frictionless wind turbine of claim 1, wherein the wind turbine eliminates contact between components, thereby reducing wear and tear.

13. A method of generating electricity using a frictionless wind turbine, the method comprising the steps of:
a) providing a housing, a plurality of turbine blades, a rigid shaft, a plurality of magnetic levitation bearings, at least one magnetic compression bearing, a plurality of stationary electrical coiled segments and a plurality of magnet segments;
b) generating a magnetic repulsive force between a pair of the plurality of magnetic levitation bearings;
c) twisting the turbine blades upon wind flow;
d) rotating the magnet segments around the plurality of stationary electrical coiled segments;
e) inducing electrical energy in the stationary electrical coiled segments by magnetic induction; and
f) transferring the electrical energy to wires in the rigid shaft.

14. The method of claim 13, wherein the rigid shaft is arranged along a longitudinal axis of the housing.

15. The method of claim 13, wherein the turbine blades initiate the twisting even at substantially less wind conditions.

16. The method of claim 13, wherein the pair of the plurality of magnetic levitation bearings is arranged along the longitudinal axis with same magnetic polarity sides in magnetic communication with each other.

17. The method of claim 13, wherein the plurality of stationary electrical coiled segments is attached to the rigid shaft.

18. The method of claim 13, wherein the magnet segments are operatively attached to the stationary electrical coiled segments.

* * * * *